May 11, 1965   A. J. KOMPANEK, JR., ETAL   3,183,301
FLEXIBLE PUSH-PULL CABLE
Filed April 5, 1961   3 Sheets-Sheet 1
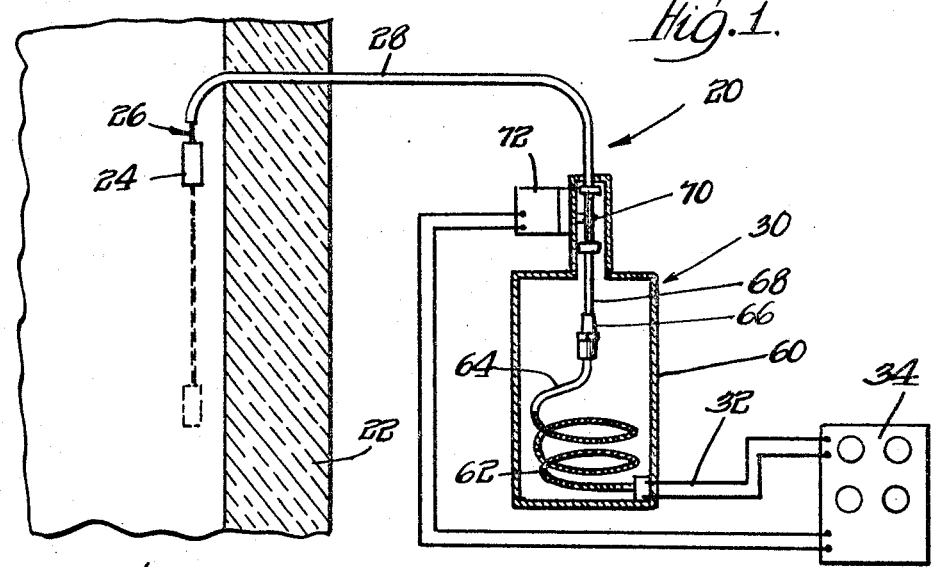
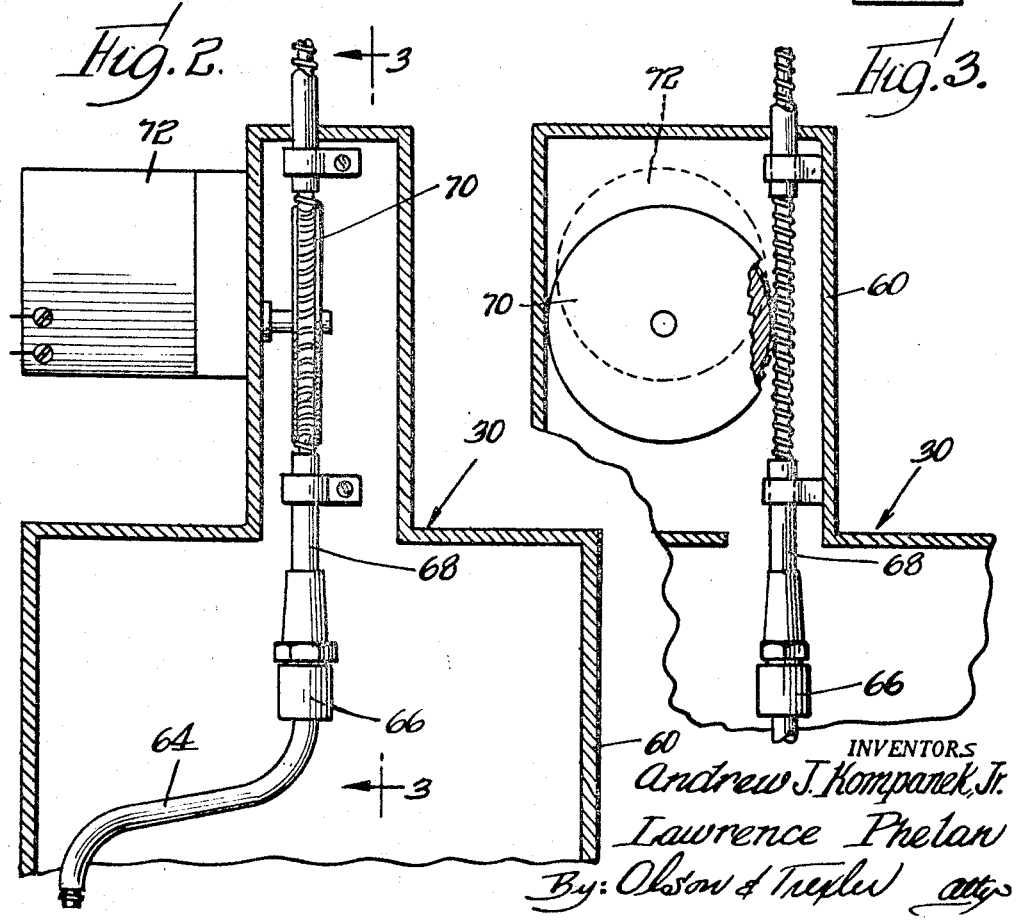
INVENTORS
Andrew J. Kompanek Jr.
Lawrence Phelan
By: Olson & Trexler   atty

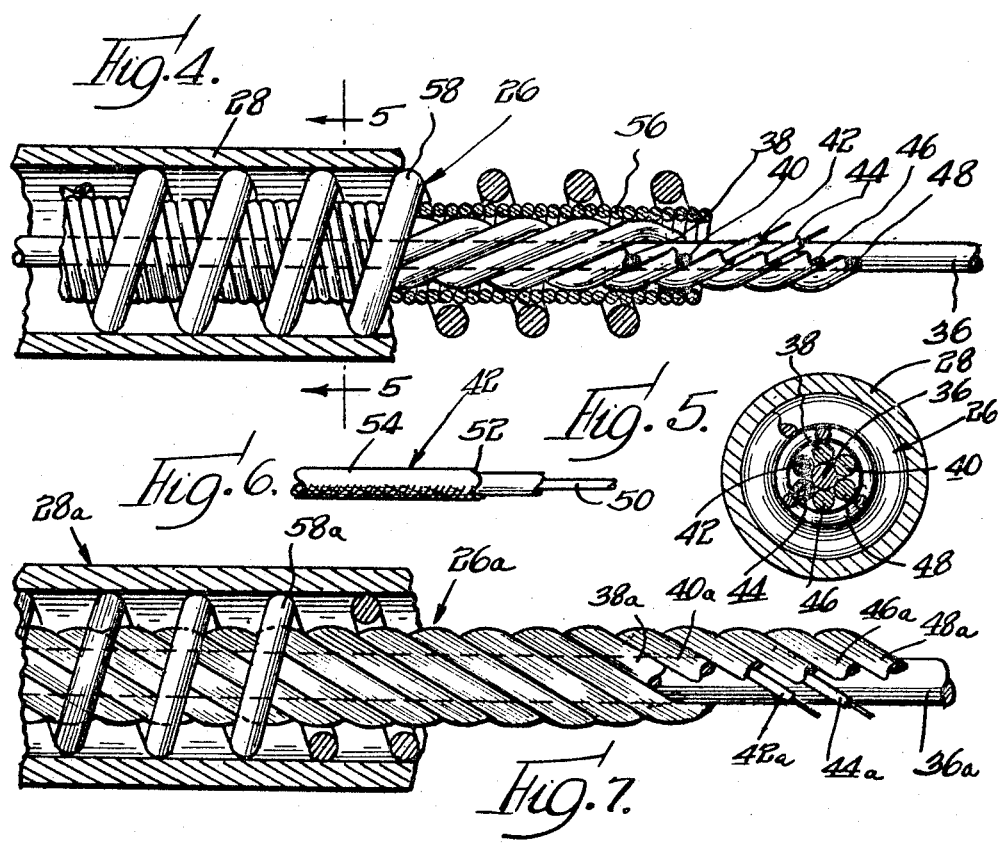
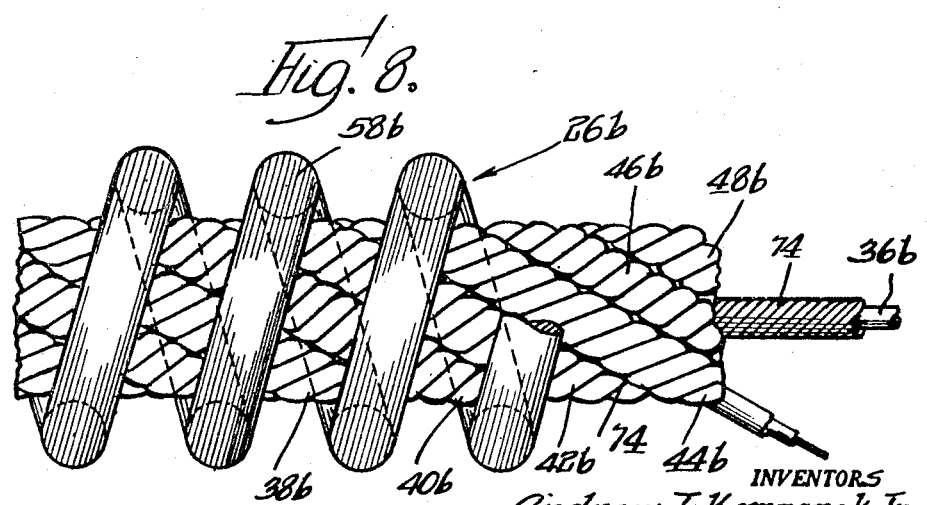

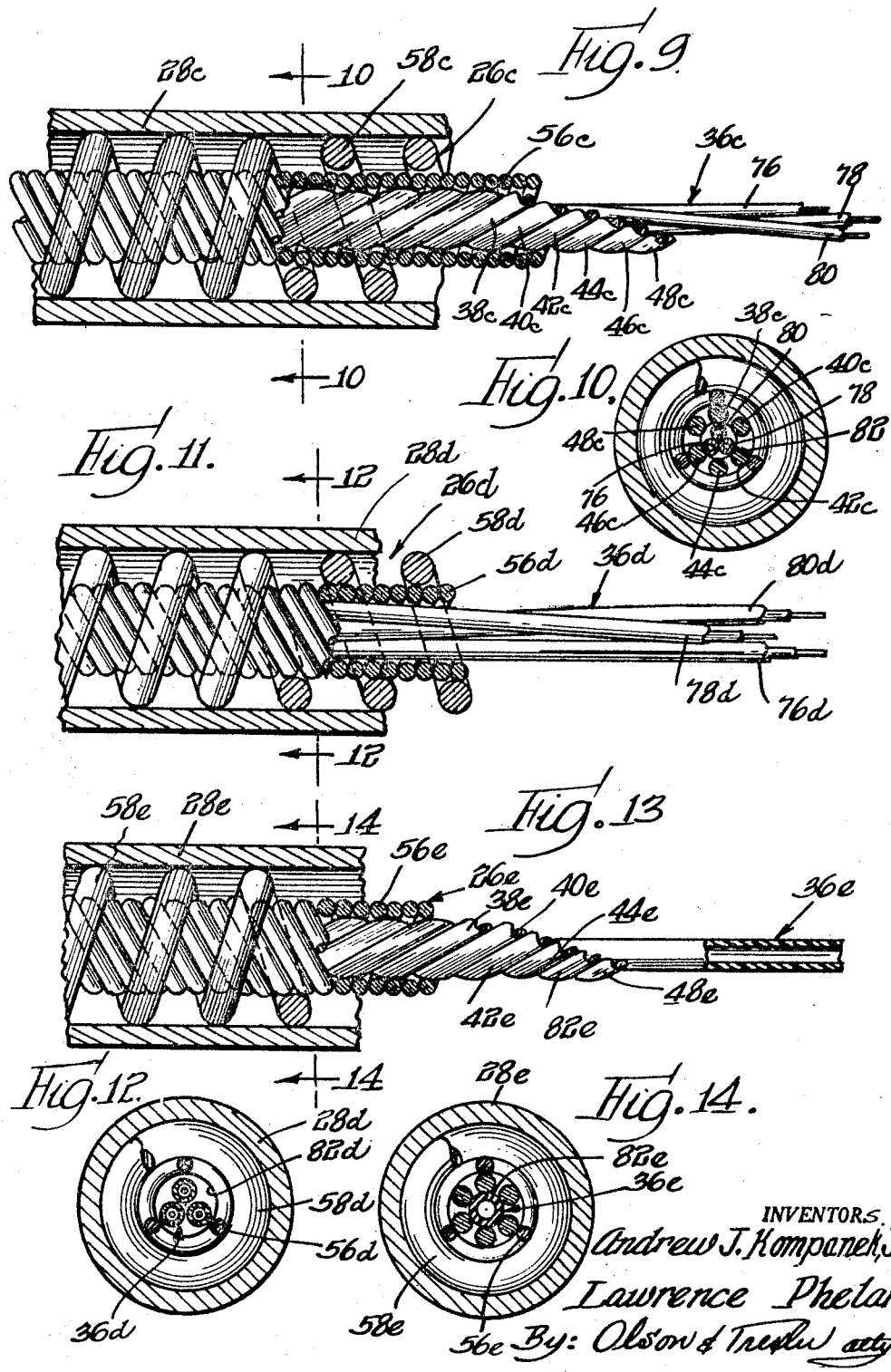

United States Patent Office 3,183,301
Patented May 11, 1965

3,183,301
FLEXIBLE PUSH-PULL CABLE
Andrew J. Kompanek, Jr., Lansdale, Pa., and Lawrence Phelan, Massapequa, N.Y., assignors to Teleflex Incorporated, North Wales, Pa., a corporation of Delaware
Filed Apr. 5, 1961, Ser. No. 100,833
7 Claims. (Cl. 174—108)

The present invention relates to a novel apparatus especially suitable for use in various control means, measuring systems and processing means in situations where access to remote or normally inaccessible locations is necessary and more specifically to novel flexible cables for use in such apparatus.

While various uses for apparatus and cables incorporating features of the present invention will suggest themselves, one use for which the apparatus may be readily adapted is for sensing temperature or other conditions at various locations within a furnace. In order to facilitate the present disclosure, an apparatus for use in this manner will be described, but it it is to be understood that the invention is not so limited.

An important object of the present invention is to provide a novel apparatus whereby measuring, sensing, control, or processing means and the like may be positioned and adjusted at remote and/or normally inaccessible locations in a rapid, accurate and safe manner.

Still another object of the present invention is to provide a novel apparatus of the above described type which is of rugged and reliable construction and which has a relatively long useful working life.

A more specific object of the present invention is to provide a novel cable construction for use in apparatus of the above described type, which cable construction is such as to facilitate rapid and accurate longitudinal and/or rotative advancement and adjustment and incorporates therein means for transmitting a flow of matter which flow may be electrical, pneumatic or hydraulic.

A further specific object of the present invention is to provide a novel cable of the above described type which is capable of withstanding and transmitting substantial tension and/or compression loads.

Still another object of the present invention is to provide a novel cable structure of the above described type which includes one or more insulated electrical wires and which is capable of withstanding high temperatures.

A further important specific object of the present invention is to provide a novel cable structure of the above described type having means for transmitting electrical or fluid flows and which is constructed so as to eliminate substantially any possibility of the application of tension or compression loads to such means during movement or adjustment of the cable.

Other objects and advantages of the present invention will become apparent from the following description and the accompanying drawings wherein:

FIG. 1 is a partially schematic view showing an apparatus incorporating features of the present invention;

FIG. 2 is an enlarged sectional view showing a portion of the apparatus utilized for adjusting the cable structure;

FIG. 3 is a fragmentary sectional view taken along line 3—3 in FIG. 2;

FIG. 4 is an enlarged partial sectional view showing a cable structure incorporating one embodiment of the present invention;

FIG. 5 is a sectional view taken along line 5—5 in FIG. 4;

FIG. 6 is a fragmentary view showing an electric wire included in the cable shown in FIGS. 4 and 5;

FIG. 7 is a fragmentary partial sectional view showing the cable structure incorporating another embodiment of the present invention;

FIG. 8 is a fragmentary view showing a cable structure embodying still another form of the present invention;

FIG. 9 is a fragmentary partial sectional view showing still another embodiment of the present invention;

FIG. 10 is a sectional view taken along line 10—10 in FIG. 9;

FIG. 11 is a fragmentary partial sectional view showing a further embodiment of the present invention;

FIG. 12 is a sectional view taken along line 12—12 in FIG. 11;

FIG. 13 is a fragmentary partial sectional view showing a further embodiment of the present invention; and FIG. 14 is a sectional view taken along line 14—14 in FIG. 13.

Referring now more specifically to the drawings wherein like parts are designated by the same numerals throughout the various figures, an apparatus 20 is shown in FIG. 1 for the purpose of illustrating one of many uses for which features of the present invention may be adapted. In the installation shown in FIG. 1 a furnace 22 is included, which furnace may be of any construction. The apparatus 20 is adapted to sense the temperature or other conditions in various portions of the furnace.

The apparatus 20 includes a sensing device 24 which could, for example, be a thermocouple or any one of numerous other devices which are known and which are capable of sensing temperature or any other condition within the furnace which is to be observed. The device 24 is connected to one end of a cable 26 which is constructed in accordance with features of the present invention which will be described in detail below. The flexible cable 26 extends through a suitable guide conduit 28 which is installed between the furnace and a cable storing and controlling unit 30 mounted at any desired location which may be at a substantial distance from the furnace. An end of the cable is secured within the unit 30 and is connected by suitable wire means 32 to recording instruments or control devices in a control panel 34 which is located at any desired position.

The flexible cable 26 which incorporates one embodiment of the present invention is shown in detail in FIGS. 4, 5 and 6. In this embodiment the flexible cable comprises a central longitudinally extending wire 36 which may be formed from steel, titanium or any other suitable strong resilient material capable of sustaining tension loads to which the cable will be subjected during use. Additional wires are wound with a relatively long lead around the central or core wire 36 to provide a layer of wires also adapted to sustain tension loads. In the embodiment shown, this layer of wires comprises six wires 38, 40, 42, 44, 46 and 48.

In accordance with a feature of the present invention one or more of the wires 38 through 48 is an electrical lead wire and is preferably formed from copper, aluminum or any other desired electricity connecting material. The remainder of these wires are formed from a material having the desired strength, resiliency and capable of performing effectively under the high or low temperature conditions or other environmental conditions to which the cable may be subjected. For example, such remaining wires may be formed from steel or titanium.

In the structure shown for the purpose of illustrating the present invention, the wires 42 and 44 are the electrical lead wires. These wires are identical to each other and as shown best in FIG. 6 each comprises a central core 50 of electricity connecting material, a layer of insulating material 52 thereon, and a sleeve 54 of fiberglass braid or other suitable protective material. The layer of insulating material 52 may be formed from ceramics, plastics, rubber or any other desired material capable of performing in the environment to which the cable is to be subjected.

In order to sustain compression loads to which the cable may be subjected, a layer of wire 56 is wound with abutting coils having a relatively short lead around the wires 38 through 48. The wires 56 may also be formed from any suitable material and may be of the same material of which the wires other than the electrical lead wires mentioned above are formed. A wire 58 is wound around the wires 56 so as to provide coils having a relatively short lead, which coils are spaced apart as shown best in FIG. 4 and also as shown in FIGS. 2 and 3 so as to provide tooth elements along the length of the cable for the purpose described below. It will be noted that the wire 58 is helically wound in a direction opposite from the helical winding of the wires 56 which in turn are wound oppositely from the wires 38 through 48.

As shown in FIGS. 1 and 2, the cable control and storage unit 30 includes a housing 60 in which a desired length of the cable 26 may be stored in a plurality of coils in the manner shown. The cable extends from the pile of coils 62 into a guide tube 64 which extends from the periphery of the housing 60 to the central axis of the housing where it is rotatably supported by a suitable swivel device 66. The swivel device or connector 66 is in turn associated with a guide tube 68 which is suitably fixed with respect to the housing 60. An end of the guide tube 68 is adjacent to but spaced from an end of the above mentioned guide conduit 28, and as shown in FIGS. 2 and 3 a gear 70 is disposed for meshing with the tooth elements provided by the wire 58 in the space between the guide conduits or tubes. The gear 70 is fixed on the output shaft of a motor and reduction gearing unit 72, which unit is electrically connected with the control panel 34 so that it may be controlled in the desired manner.

As shown in FIG. 4 the guide conduit 28 closely but slidably receives the cable 26 and, as indicated above, the cable construction is such that it is capable of sustaining compression and tension loads. With this arrangement, the cable may be easily and accurately advanced or retracted by properly energizing the reversible electric motor of the unit 72 since the construction of the cable and the fixed path of travel provided by the guide conduit 28 effectively minimizes and substantially eliminates excessive changes in the effective length of the cable. As a result, the device 24 may be adjusted with precision within the furnace 22.

FIG. 7 shows a cable structure incorporating a modified form of the present invention. This cable structure is similar to the cable described above as indicated by the application of identical reference numerals with the suffix $a$ added to corresponding elements and it is to be understood that this cable structure as well as those of the other embodiments described below may be utilized in an apparatus identical to the apparatus 20 or a modification thereof having various different control or sensing devices. The cable 26a is particularly suitable for use in installations in which it is contemplated that the cable will not be subjected to substantial compression loads. Thus, the cable 26a has been simplified by the elimination of the compression accommodating wires 56 described above.

FIG. 8 shows a cable structure incorporating still another embodiment of the present invention, which structure is similar to the cable shown in FIG. 7 as indicated by the application of identical reference numerals with the suffix $b$ added to corresponding elements. In this embodiment the wires 36b through 48b are respectively wrapped with threads 74 of plastic, glass fiber or any other suitable material for minimizing abrasion between the wires and thereby reducing any possibility of injury to the insulating material on the electrical lead wires.

FIGS. 9 and 10 show a cable 26c which illustrates another important feature of the present invention. It is important to note that in this embodiment it is contemplated that the central wire means 36c shall comprise one or more insulated electrical wires 76, 78 and 80 each of which is provided with a core of copper, aluminum or any other suitable electricity conducting material and a jacket of ceramic, rubber, plastic or other suitable insulating material. Furthermore, the wires 38c through 48c may all be structural rather than electrical elements and are helically wound with a relatively long lead in the manner shown so as to define a central hollow core or passageway 82. In this embodiment the wires 38c–48c are adapted to accommodate substantially all of any tension load which may be applied to the cable and the central electrical lead wire means 36c, whether it comprise one or a plurality of wires, is adapted to be free of any substantial tension or compression loads. This arrangement minimizes any possibility of damage to the insulation and also effects of noise and change in capacitance which may occur when insulated conductors are placed under loads as strength numbers. The central electric lead wire means 36c may be relatively loosely disposed within the hollow passageway 82 and in certain instances, the lead wire means may be axially slidable relative to the wall of the passageway 82 defined by the wires 38c through 48c so that the lead wire means may be removed and replaced.

The cable 26c also comprises a compression accommodating sheath 56c formed from one or more wires wound with a relatively short lead and abutting coils. The wire or wires of the sheath 56c may be provided for compression accommodating purposes only or, if desired, they may also be provided as insulated electrical lead wires. It will be appreciated that the corresponding wires in other of the embodiments disclosed herein may also be insulated electrical lead wires.

In FIGS. 11 and 12 a cable 26d is shown which is similar to the cables described above as indicated by the application of identical reference numerals with the suffix $d$ added to corresponding elements. In this embodiment the cable is particularly adapted for use in installations in which it is contemplated that the cable will be primarily subjected to compression loads. Thus the cable has been simplified by eliminating the previously described wires 38 through 48 which were provided for the purpose of accommodating tension loads.

FIGS. 13 and 14 show a further embodiment which illustrates still another important feature of the present invention. In this embodiment the cable structure is substantially identical to the embodiment shown in FIGS. 9 and 10 as indicated by the application of identical reference numerals with the suffix $e$ added to corresponding elements. However, this embodiment differs in that the passageway 82e of the cable is lined by a core element 36e in the form of an impervious tube. The tube may be formed from any suitable plastic, rubber or even metal material having the desired flexibility. The tube may be used to accommodate pneumatic or hydraulic impulses or flows or, if desired, the tube could be used as a suction or vacuum tube. Thus it is apparent that the cable 26e is specially suitable for use in installations which will incorporate pneumatic or hydraulic sensing or control devices or the like. However, it is also contemplated that in certain installations an electrical lead wire could be inserted through the tube 36e so as to adapt the cable for use in installations incorporating both electrical and fluid pressure devices.

While the preferred embodiments of the present invention have been shown and described herein, it is obvious that many structural details may be changed without departing from the spirit and scope of the appended claims.

The invention is claimed as follows:

1. A flexible push-pull cable of the type described comprising helically wound wire means defining a longitudinally extending central passageway, core means extending through said passageway, one of said means comprising flow conducting means which is substantially free of longitudinal cable loads, the other of said means carrying the longitudinal loads to which the cable is subjected, and a peripherally disposed wire helically wound around said wire means and presenting spaced coils providing tooth elements cooperable with gear means and the like, said flow conducting means comprising a hollow tube which provides said core means.

2. A flexible push-pull cable of the type described comprising a plurality of wire means helically wound with a relatively long lead and defining a longitudinally extending central passageway, said wire means being adapted to accommodate tension loads, core means extending through said passageway, at least a part of one of said means comprising flow conducting means and which part is substantially free of longitudinal cable loads, and a peripherally disposed wire helically wound around said wire means with a relatively short lead and presenting spaced coils providing tooth elements cooperable with gear means and the like.

3. A flexible push-pull cable, as defined in claim 2, wherein said flow conducting means comprises insulated electrical wire means and is provided by certain of said wire means.

4. A flexible push-pull cable, as defined in claim 2, wherein said flow conducting means comprises insulated electrical wire means and is provided by said core means.

5. A flexible push-pull cable, as defined in claim 2, wherein said core means comprises a hollow tube and provides said flow conducting means.

6. A flexible push-pull cable, as defined in claim 2, which includes additional wire means between said first mentioned wire means and said peripheral wire, said additional wire means being helically wound on said first mentioned wire means with a relatively short lead and with abutting coils for accommodating any compression loads to which the cable may be subjected.

7. A flexible push-pull cable, as defined in claim 6, wherein said additional wire means comprises an insulated electrical wire which provides said flow conducting means.

References Cited by the Examiner

UNITED STATES PATENTS

| | | | |
|---|---|---|---|
| 1,951,723 | 3/34 | Burd et al. | 174—108 |
| 2,211,790 | 8/40 | Pile | 174—128 X |
| 2,463,590 | 3/49 | Arutunoff | 174—128 X |
| 2,496,785 | 2/50 | Finneburgh et al. | 191—12.2 |
| 2,998,474 | 8/61 | Pavlic | 174—47 |

FOREIGN PATENTS 437,194 10/35 Great Britain.

LARAMIE E. ASKIN, *Primary Examiner.*

BENNETT G. MILLER, JOHN P. WILDMAN, DARRELL L. CLAY, *Examiners.*